United States Patent Office  2,932,606
Patented Apr. 12, 1960

2,932,606

DELTA 1,2-14α-HYDROXY DERIVATIVES OF CORTISONE AND HYDROCORTISONE

Gilbert M. Shull, Huntington Station, and Donald A. Kita, Jackson Heights, N.Y., assignors to Chas. Pfizer & Co., Inc., New York, N.Y., a corporation of Delaware No Drawing. Application January 28, 1955
Serial No. 484,828

8 Claims. (Cl. 167—65)

This invention is concerned with certain novel steroid compounds which are formed when certain other steroids are subjected to the oxidizing activity, particularly the dehydrogenating activity, of microorganisms of the genus Mycobacterium.

This application is a continuation-in-part of the copending parent application Serial Number 431,619, filed on May 21, 1954, by Gilbert M. Shull et al. and now abandoned. In that application there is described the oxidation of steroids by use of microorganisms of the genus Mycobacterium, and that material is here incorporated by reference.

The starting materials for the syntheses of the present invention are delta 4-pregnen-11β,14α,17α,21-tetraol-3,20-dione and delta 4-pregnen-14α,17α,21-triol-3,11,20-trione. The first of these is described in copending application Serial Number 476,556, filed on December 20, 1954, by Gilbert M. Shull et al. and issued May 15, 1956, as U.S. Patent 2,745,784. The second is described in copending application Serial Number 432,314, filed on May 25, 1954, by Eugene J. Agnello et al. and issued April 9, 1957, as U.S. Patent 2,788,354. When each of these compounds is subjected to the oxidizing activity of Mycobacterium, dehydrogenation takes place at the 1 and 2-positions, and a double bond is formed between these positions. The respective products are delta 1,4-pregnadien-11β,14α,17α,21-tetraol-3,20-dione, hereafter called compound I, and delta 1,4-pregnadien-14α,17α,21-triol-3,11,20-trione, hereafter called compound II. Other steroids as yet unidentified are also produced.

As the 21-position hydroxyl group is the only primary alcohol group present in the molecule of either of these products, it may readily be esterified selectively by standard procedures, for example treatment with an acid anhydride or acyl halide in the presence of an organic base such as pyridine. Acetic anhydride, succinic anhydride, phthalic anhydride, propionyl chloride, benzoyl chloride, etc. have all been used in this fashion. Fischer esterification and transesterification are also useful. When the acylating agent is that of a polybasic acid, e.g. succinic acid, acid esters are formed. These have an advantage in that alkali metal salts, e.g. the sodium salt, of these acid esters are water soluble. Such salts are readily formed from the acid ester by treatment with an equimolecular amount of a weak base, such as sodium bicarbonate.

The novel compounds of this present invention have the generic formula

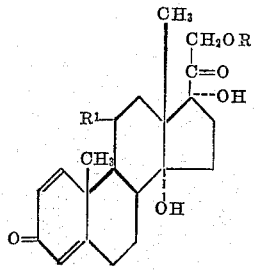

wherein R is selected from the group consisting of hydrogen and acyl and R¹ is selected from the group consisting of β-hydroxyl and keto. Of course, when R¹ is hydroxyl, there is also a hydrogen atom at the 11-position.

These compounds are very valuable because of their activity as adrenocortical hormones. They are very useful in the treatment of a variety of diseases, particularly the collagen diseases such as rheumatoid arthritis. They are also useful in treating such sicknesses as asthma, and, because of their anti-inflammatory action, they are also useful to treat certain types of skin diseases and certain types of irritation of the eye. Their particular advantage lies in the fact that they combine high activity with minimum side effects.

Each of the compounds of the present invention may be administered alone or in combination with acceptable pharmaceutical carriers. Dosage is in general of approximately the same order of magnitude as is the case with hydrocortisone, but a wider range of dosage exists. In some cases the activity of these compounds is such that a smaller dose will suffice, but the freedom from side effects permits the giving of larger doses when they are required. The choice of carrier is determined by the chosen route of administration, the solubility of the particular compound, and by standard pharmaceutical practices. Excipients such as starch and milk sugar may be used to prepare tablets for oral administration. Elixirs containing flavoring and sweetening agents may also be used. For intra-articular injection compositions containing enough saline to make them isotonic may be used. When water soluble compounds such as the sodium succinate of compound I and compound II are administered, aqueous solutions may be employed. Filtration through a Seitz filter is a convenient method for sterilizing such a solution. Small amounts of a preservative such as chlorobutanol may also be added to maintain sterility.

The following examples are given by way of illustration and are not to be considered as limitations of this invention. Indeed, as many apparently widely different embodiments of the present invention may be made without departing from the spirit and scope hereof, it is to be understood that this invention is not limited, except as defined in the appended claims.

Example I

To a four liter Pyrex glass vessel equipped for conducting submerged aerated fermentation was added two liters of the following medium (known as Turfitt's medium):

| | Percent |
|---|---|
| Ammonium nitrate | 0.1 |
| Dipotassium acid phosphate | 0.025 |
| Magnesium sulfate heptahydrate | 0.25 |
| Sodium chloride | 0.0005 |
| Ferrous sulfate heptahydrate | 0.00001 |
| Calcium carbonate | 0.5 |

The aqueous medium was sterilized and then inoculated with 100 ml. of a culture of *Mycobacterium smegmatis* ATCC 12,051, grown in a shake flask on nutrient broth. After three days, 0.25 gram of 14α-hydroxy compound F was added. The mixture was agitated and aerated with sterile air. Four days after the addition of the steroid, the whole mixture was extracted with approximately 2 liters of chloroform. The chloroform extract was treated with activated carbon, filtered and reduced to a small volume by evaporation, and then placed on a silica gel-ethanol chromatography column. The column was eluted with mixtures of ethylene chloride and 95% ethanol, starting with mixtures containing about 2% by volume ethanol, and gradually increasing the percentage of ethanol. Compound I was recovered in this fashion and found to have M.P. 227–229° C., sp. rot. $\alpha_{25°}D +103.5°$ in dioxane and $$\lambda_{max.}^{H_2SO_4}\ 264, 389$$

and 495 m$\mu$.

Example II

The procedure of Example I was repeated, except that the steroid used was 14α-hydroxy cortisone. Compound II was recovered by a similar method.

Example III

A series of experiments were run using the procedures described in Examples I and II above, but instead of using *Mycobacterium smegmatis*, the following species of mycobacteria were used:

M. phlei        M. thamnopheos
M. ranae        M. lacticola
M. butyricum    M. friedmanni
M. berolinense  M. tuberculosis The products were recovered from the reaction mixture by extraction and subjected to evaluation by the paper chromatography method. In each case, it was found that dehydrogenation at the 1-position had occurred.

Example IV

Compound I was treated with a molecular equivalent of acetic anhydride in pyridine at room temperature. After 18 hours, the mixture was poured into cold water, extracted twice with chloroform and the chloroform extracts combined. The combined extracts were washed with 1 N sulfuric acid, with saturated aqueous sodium bicarbonate solution and then with water. The chloroform solution was then filtered through a diatomaceous earth filter and evaporated to dryness. The residue was triturated with ether and the residual undissolved material was dried. This dried product was identified as the 21-position acetate ester of compound I. In identical fashion, the 21-position acetate ester of compound II was prepared.

Example V 0.5 gram of compound I was added to 1 gram of anhydrous formic acid in 15 ml. of benzene, and the mixture was stirred for 2 hours at room temperature. It was then cooled, and poured into cold water. The benzene layer was removed, dried over anhydrous magnesium sulfate and evaporated to dryness. The residue was purified by recrystallization and shown to be the 21-position formate ester of compound I. In an identical fashion, the 21-position formate ester of compound II was prepared.

Example VI

Propionyl chloride (7 millimoles) was added to a solution of 5 millimoles of compound I dissolved in 5 ml. of pyridine. The solution was stirred and cooled in ice until heat evolution had subsided. The mixture was then allowed to stand overnight at room temperature. It was poured into 50 ml. of ice cold 3 N sulfuric acid. The mixture was extracted twice with two 50 ml. portions of chloroform. The combined extracts were washed with 1 N sulfuric acid, with saturated aqueous sodium bicarbonate solution and then with water. The chloroform solution was then filtered through a diatomaceous earth filter and was evaporated to dryness. The residue was triturated with ether, and the residual undissolved material was dried. This dried product was identified as the 21-position propionate ester of compound I.

By similar reactions, using either the acid chloride or the acid anhydride of the acid, esters of compound I and of each of a wide variety of organic carboxylic acids were prepared. These included, for example, the esters of butyric acid, valeric acid, caproic acid, heptoic acid, caprylic acid, nonylic acid and capric acid. The acids had both straight and branched carbon chains. They may also be unsaturated. In all cases the reaction was analogous to that given above. Identical results were obtained using compound II.

Example VII

Ortho-toluyl chloride (6.6 millimoles) was added to a solution of 5.5 millimoles of compound I dissolved in 5 ml. of pyridine. The solution was stirred and cooled in ice until the heat evolution had subsided. The mixture was then allowed to stand 20 hours at 25° C. It was poured into 50 ml. of ice cold 3 N sulfuric acid. The mixture was extracted twice with two 50 ml. portions of chloroform. The combined extracts were washed with 1 N sulfuric acid, with saturated aqueous sodium bicarbonate solution and then with water. The chloroform solution was then filtered through a diatomaceous earth filter aid and was evaporated to dryness. The residue was triturated with ether, and the residual undissolved material was dried. This dried product was then purified by recrystallization from isopropyl alcohol, and identified as compound I ortho-toluate.

By analogous procedures, using the corresponding acid chloride in each case, the benzoate, 1-ethylcyclohexane carboxylate, cyclohexane carboxylate and 1-methylcyclopropane carboxylate esters of compound I were also prepared. These cyclic esters, particularly those formed from acids wherein the carbon atoms adjacent to the carboxyl group is a member of a hydrocarbon ring having from three to six carbon atoms, are particularly valuable and have advantages over the free alcohol since they exhibit prolonged therapeutic activity. Identical results were obtained with compound II.

Example VIII

A solution of 3 grams of compound I in 12 ml. of pyridine was treated with 1.2 grams of phthalic anhydride. The mixture was allowed to stand at room temperature for 18 hours, and it was then poured into 150 ml. of ice cold 2 N sulfuric acid. During the addition to the sulfuric acid, the mixture was rapidly stirred. A white solid product separated and was filtered from the aqueous solution. It was washed repeatedly with small portions of water and then with a solution of methanol in water. The product was then dried under vacuum, and purified by recrystallization from ethanol. Analysis showed it to be the acid ester, compound I hemiphthalate. Identical results were obtained with compound II.

A solution of 3 grams of compound I in 15 ml. of quinoline was treated with 1 gram of succinic anhydride. After being stirred overnight at room temperature, the mixture was poured with stirring into 200 ml. of ice cold 2 N sulfuric acid. The precipitate was filtered, washed repeatedly with water and dried under vacuum. It was then recrystallized from alcohol. Analysis showed it to be compound I hemi-succinate. Identical results were obtained with compound II.

Example IX

A gram and a half of compound I succinate was dissolved in 15 ml. of water containing an equi-molecular amount of sodium bicarbonate. The mixture was stirred and gently warmed, and then placed under vacuum for a short time to remove carbon dioxide. The solution of the sodium salt was frozen and dried under vacuum from the frozen state. The product, the sodium salt of compound I succinate was quite soluble in water and suitable for use in the form of an aqueous solution for injection. This is an advantage not possible with the free alcohol or with ordinary esters. Saline may be used to form an isotonic solution for this purpose if desired, and so may glucose. Identical results were obtained with compound II.

Example X

As mentioned above, the compounds of this invention may be administered alone or in combination with other compatible materials. This example and the following examples illustrate some of these therapeutic compositions in which compound I or compound II is the principal active ingredient.

The following is a typical composition of a tablet suitable for oral administration:

| | Mg./tablet |
|---|---|
| Compound I | 20 |
| Calcium phosphate (diabasic) | 150 |
| Milk sugar | 60 |
| Potato starch | 35 |
| Magnesium stearate | 5 |
| Magnesium trisilicate | 30 |

Similar compositions may also be used with compound II instead of compound I.

Example XI

Because of their anti-inflammatory activity, the compounds of this invention are useful to treat a wide variety of diseases of the skin. For such type of treatment, a topical ointment is often employed and the following is a typical composition of such an ointment:

| | Mg. |
|---|---|
| Compound I acetate | 25 |
| Sodium lauryl sulfate U.S.P. | 10 |
| Propylene glycol U.S.P. | 115 |
| Stearyl alcohol | 80 |
| Cetyl alcohol (N.F.) | 70 |
| Cholesterol U.S.P. | 45 |
| White petrolatum U.S.P. | 190 |
| Mineral oil U.S.P. | 50 |
| Water | 400 |
| Methyl paraben | 1.0 |
| Propyl paraben | 0.02 |

Similar compositions may also be used with compound II instead of compound I.

Example XII

The following is a typical composition of compound I acetate, used for intra-articular injection:

| | Gms. |
|---|---|
| Compound I acetate | 25 |
| Sodium chloride U.S.P. | 9 |
| Sodium carboxymethylcellulose | 5 |
| Methocel 15 | 1 |
| Tween 80 U.S.P. | 1.9 |
| Methyl paraben | 2.4 |
| Propyl paraben | 0.26 |
| Water, q.s. to make 1000 ml. | |

Similar compositions may also be used with compound II instead of compound I.

Example XIII

Because of their anti-inflammatory activity, the compounds of this invention are useful to treat a wide variety of diseases of the eye. For such type of treatment, an ophthalmic suspension is often employed and the following is a typical composition of such a suspension:

| | Gms. |
|---|---|
| Compound I acetate | 25.00 |
| Sodium carboxymethylcellulose | 27.75 |
| Polyvinyl pyrrolidone | 3.00 |
| Benzyl alcohol U.S.P. | 9.00 |
| Polysorbate U.S.P. | 0.46 |
| Water | 951.25 |

Similar compositions may also be used with compound II instead of compound I.

What is claimed is:

1. A compound having the formula

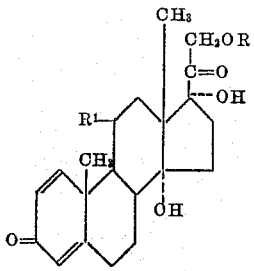

wherein R is selected from the group consisting of hydrogen and acyl hydrocarbon containing up to ten carbon atoms, and $R^1$ is selected from the group consisting of $\beta$-hydroxyl and keto.

2. Delta 1,4-pregnadien-11$\beta$, 14$\alpha$, 17$\alpha$, 21-tetraol-3,20-dione.

3. Delta 1,4-pregnadien-14$\alpha$, 17$\alpha$, 21-triol-3,11,20-trione.

4. A therapeutic composition consisting of delta 1,4-pregnadien-11$\beta$, 14$\alpha$, 17$\alpha$, 21-tetraol-3,20-dione and a pharmaceutical carrier.

5. A therapeutic composition consisting of delta 1,4-pregnadien-14$\alpha$, 17$\alpha$, 21-triol-3,11,20-trione and a pharmaceutical carrier.

6. Delta 1,4-pregnadien-11$\beta$, 14$\alpha$, 17$\alpha$, 21-tetraol-3,20-dione-21-acetate.

7. Delta 1,4-pregnadien-14$\alpha$, 17$\alpha$, 21-triol-3,11,20-trione-21-acetate.

8. A therapeutic composition comprising a compound as claimed in claim 1 together with a pharmaceutically acceptable carrier.

References Cited in the file of this patent

UNITED STATES PATENTS

| | | |
|---|---|---|
| 2,280,828 | Inhoffen | Apr. 28, 1942 |
| 2,579,479 | Djerassi | Dec. 25, 1951 |
| 2,649,402 | Murray | Aug. 18, 1953 |
| 2,658,023 | Shull | Nov. 3, 1953 |
| 2,703,805 | Rosenkranz | Mar. 8, 1955 |
| 2,705,237 | Djerassi | Mar. 29, 1955 |
| 2,788,354 | Agnello et al. | Apr. 9, 1957 |